(12) United States Patent
Chou

(10) Patent No.: US 10,009,174 B2
(45) Date of Patent: Jun. 26, 2018

(54) KEY PROTECTING DEVICE AND KEY PROTECTING METHOD

(71) Applicant: MStar Semiconductor, Inc., Hsinchu Hsien (TW)

(72) Inventor: Chun-Ming Chou, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 219 days.

(21) Appl. No.: 14/804,411

(22) Filed: Jul. 21, 2015

(65) Prior Publication Data
US 2016/0344545 A1    Nov. 24, 2016

(30) Foreign Application Priority Data
May 22, 2015    (TW) .............................. 104116423 A (51) Int. Cl.
*H04L 29/06* (2006.01)
*H04L 9/08* (2006.01)

(52) U.S. Cl.
CPC .................................. *H04L 9/0822* (2013.01)

(58) Field of Classification Search
CPC ... H04L 9/0822; H04L 9/0894; B67D 1/0027; B67D 1/0878; B67D 1/0888; C02F 1/008; C02F 1/42; C02F 1/688; C02F 2209/008; C02F 2209/05; C02F 2303/16; G01F 23/0007; G01F 23/292; G01F 23/2928; G06Q 10/10; G06Q 30/0203

USPC .......................................................... 380/277
See application file for complete search history.

(56) References Cited

U.S. PATENT DOCUMENTS

| 8,051,297 | B2 * | 11/2011 | Machani | ............... H04L 9/0822 713/185 |
| 2005/0005156 | A1 * | 1/2005 | Harper | ...................... H04L 9/08 726/26 |
| 2009/0052670 | A1 * | 2/2009 | You | ........................ G06F 21/10 380/277 |
| 2010/0332826 | A1 * | 12/2010 | Lin | ........................ G06F 21/10 713/158 |
| 2012/0066498 | A1 * | 3/2012 | Engert | .................... G06F 21/51 713/170 |
| 2014/0219445 | A1 | 8/2014 | Lee et al. | |

OTHER PUBLICATIONS

TIPO Office Action, dated Jun. 8, 2016, 8 pages.

* cited by examiner

*Primary Examiner* — Abiy Getachew
(74) *Attorney, Agent, or Firm* — Edell, Shapiro & Finnan, LLC (57) ABSTRACT

A key protecting device is provided. The key protecting device includes a crypto engine, a ROM and a processor. The ROM stores a chip unique key, and is exclusively accessible to the crypto engine. The processor receives a first salt value and a first encrypted key from a non-volatile memory. The crypto engine receives the chip unique key from the ROM, receives the first salt value and the first encrypted key from the processor, and generates a first key according to the first salt value, the chip unique key and the first encrypted key.

14 Claims, 7 Drawing Sheets

KEY PROTECTING DEVICE AND KEY PROTECTING METHOD

This application claims the benefit of Taiwan application Serial No. 104116423, filed May 22, 2015, the subject matter of which is incorporated herein by reference.

BACKGROUND OF THE INVENTION

Field of the Invention

The invention relates in general to a processing device and a processing method, and more particularly to a key protecting device and a key protecting method.

Description of the Related Art

Methods that users use to obtain media services through user devices get more diversified as technologies continue progressing. For example, a user may obtain service contents a service provider provides through a user device. The service contents are usually encrypted. After the user device obtains the encrypted service contents, the encrypted contents need to be decrypted through a key pre-stored in the user device to obtain the service contents. Therefore, as far as the security of media services is concerned, key protection is an essential task.

SUMMARY OF THE INVENTION

The invention is directed to a key protecting device and a key protecting method that encrypt and decrypt using a salt and a chip unique key.

According to an aspect of the present invention, a key protecting device is provided. The key protecting device includes a crypto engine, a read-only memory (ROM) and a processor. The ROM stores a chip unique key, and is exclusively accessible to the crypto engine. The processor receives a first salt value and a first encrypted key from a non-volatile memory. The crypto engine receives the chip unique key from the ROM, receives the first salt value and the first encrypted key from the processor, and generates a first key according to the first salt value, the chip unique key and the first encrypted key.

According to another aspect of the present invention, a key protecting method is provided. The key protecting method includes: receiving a first salt value from a non-volatile memory, receiving a chip unique key from a ROM that is exclusively accessible to a crypto engine, and generating a first key according to the first salt value, the chip unique key and a first encrypted key.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
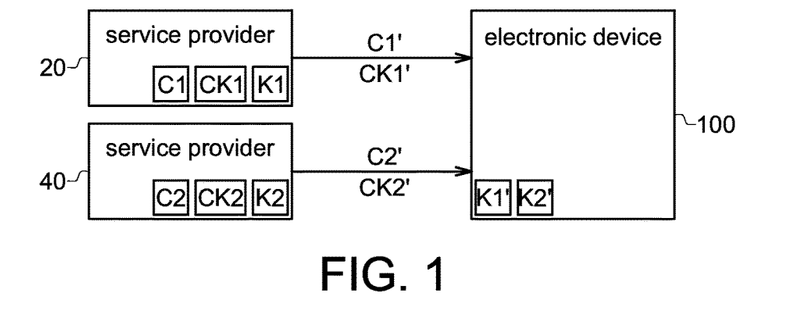
FIG. 1 is a schematic diagram of an electronic device obtaining service contents from service providers.

FIG. 1 shows a schematic diagram of an electronic device 100 obtaining service contents C1 and C2 from service providers 20 and 40. In FIG. 1, the two service providers 20 and 40 are taken as examples. In practice, the number of service providers may be one or more than two, e.g., one or five. For example, the electronic device 100 is a smart television, a desktop computer, a laptop computer, a tablet computer or a smart phone. The service providers 20 and 40 provide the service contents C1 and C2 to the electronic device 100. For example, the service providers 20 and 40 may be servers, and the service contents C1 and C2 may be multimedia data. The electronic device 100 obtains the service content C1 from the service provider 20, and obtains the service content C2 from the service provider 40. To protect the service content C1, the service provider 20 encrypts the service content C1 using a content encrypted key CK1 to generate an encrypted service content C1', and encrypts the encrypted key CK1 using a key K1 to generate an encrypted content encrypted key CK1'. The encrypted service content C1' and the encrypted content encrypted key CK1' are then transmitted to the electronic device 100. Similarly, to protect the service content C2, the service provider 40 encrypts the service content C2 using a content encrypted key CK2 to generate an encrypted service content C2', and encrypts the content encrypted key CK2 using a key K2 to generate an encrypted content encrypted key CK2'. The encrypted service content C2' and the encrypted content encrypted key CK2' are then transmitted to the electronic device 100.

The electronic device 100 internally stores encrypted keys K1' and K2'. An application AP1 corresponding to the service provider 20 is installed on the electronic device 100. The electronic device 100 obtains the encrypted service content C1' and the encrypted content encrypted key CK1' from the service provider 20 through the application AP1, decrypts the encrypted content encrypted key CK1' using the using K1 to generate the content encrypted key CK1, and decrypts the encrypted service content C1' using the content encrypted key CK1 to obtain the service content C1. Similarly, an application AP2 corresponding to the service provider 40 is installed on the electronic device 100. The electronic device 100 obtains the encrypted service content C2' and the encrypted content encrypted key CK2' from the service provider 40 through the application AP2, decrypts the encrypted content encrypted key CK2' using the using K2 to generate the content encrypted key CK2, and decrypts the encrypted service content C2' using the content encrypted key CK2 to obtain the service content C2.

Figure 2:
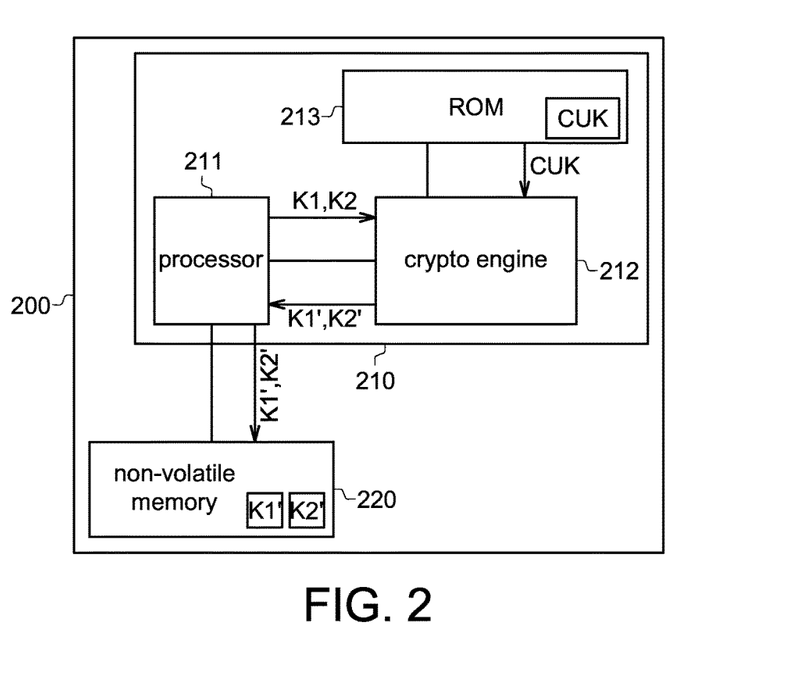
FIG. 2 is a schematic diagram of an example of an electronic device.

FIG. 2 shows a schematic diagram of an example of the electronic device 100 in FIG. 1. An electronic device 200 includes a key protecting device 210 and a non-volatile memory 220. The electronic device 200 encrypts the keys K1 and K2 through the key protecting device 210 to generate the encrypted keys K1' and K2', and stores the encrypted keys K1' and K2' in the non-volatile memory 220 of the electronic device 200. For example, the non-volatile memory 220 is a NAND flash. The key protecting device 210 includes a processor 211, a crypto engine 212 and a read-only memory (ROM) 213. For example, the processor 211 and the crypto engine 212 are a chip, a circuit board, or a computer-readable storage medium stored with a plurality of program codes. The processor 211 is coupled to the non-volatile memory 220 and the crypto engine 212. The crypto engine 212 is coupled to the ROM 213. The ROM 213 stores a chip unique key CUK, and is exclusively accessible to the crypto engine 212. For example, the ROM 213 is a one-time programmable (OTP) memory or an e-fuse. The key protecting device 210 encrypts the keys K1 and K2 according to the chip unique key CUK stored in the ROM 213 to generate the encrypted keys K1' and K2'. For example, the processor 211 obtains the key K1; the crypto engine 212 receives the chip unique key CUK from the ROM 213 and receives the key K1 from the processor 211, and generates the encrypted key K1' according to the chip unique key CUK and the key K1. The processor 211 then obtains the encrypted key K1' from the crypto engine 212 and stores the encrypted key K1' to the non-volatile memory 220. Similarly, the processor 211 obtains the key K2; the crypto engine 212 receives the chip unique key CUK from the ROM 213, receives the key K2 from the processor 211, and generates the encrypted key K2' according to the chip unique key CUK and the key K2. The processor 211 then obtains the encrypted key K2' from the crypto engine 212, and stores the encrypted key K2' to the non-volatile memory 220.

Further, the crypto engine 212 performs a key process on the chip unique key CUK and the key K1 to generate the encrypted key K1'. Similarly, the crypto engine 212 performs the key process on the chip unique key CUK and the key K2 to generate the encrypted key K2'. For example, but not limited to, the key processor may be based on the advance encryption standard (AES) or an XOR logic computation.

As such, even if the encrypted key K1' or K2' stored in the non-volatile memory 220 is illegally obtained by an intruder due to a loophole in the electronic device 200, as the chip unique key CUK for decrypting the encrypted key K1' or K2' is stored in the ROM 213 that is exclusively accessible to the crypto engine 212 but no other units, it is impossible for the intruder to decrypt the encrypted key K1' or K2' to obtain the key K1 or K2. In other words, by encrypting the keys K1 and K2 though the chip unique key CUK and storing the chip unique key CUK in the ROM 213 that is exclusively accessible to the crypto engine 212, the security of the keys K1 and K2 is enhanced.

Due to a loophole of the application AP2 provided by the service provider 40 and installed on the electronic device 200, an intruder may provide the encrypted key K2' of the service provider 40 to the crypto engine 212 and control the crypto engine 212 to decrypt key K2 using the chip unique key CUK to further obtain the key K2 of the service provider 40. As the keys K1 and K2 are both encrypted by the chip unique key CUK, the intruder may also provide the encrypted key K1' of the service provider 20 to the crypto engine 212 and control the crypto engine 212 to decrypt the encrypted key K1' using the chip unique key CUK to further obtain the key K1 of the service provider 20. In other words, even if the intruder is incapable of directly obtaining the chip unique key CUK through the processor 211 to decrypt the encrypted keys K1' and K2' to further obtain the keys K1 and K2, the intruder may nonetheless indirectly obtain the keys K1 and K2 through controlling the crypto engine 212 by the processor 211. It is known from the above, since the keys K1 and K2 are both encrypted by the chip unique key CUK, even if the application AP1 provided by the service provider 20 and installed on the electronic device 100 is loophole-free, the key K1 of the service provider 20 may still be cracked due to a loophole of the application AP2 provided by the service provider 40 and installed on the electronic device 100. To eliminate the above issue, there is a need for a more secure method for encrypting the key.

Figure 3:
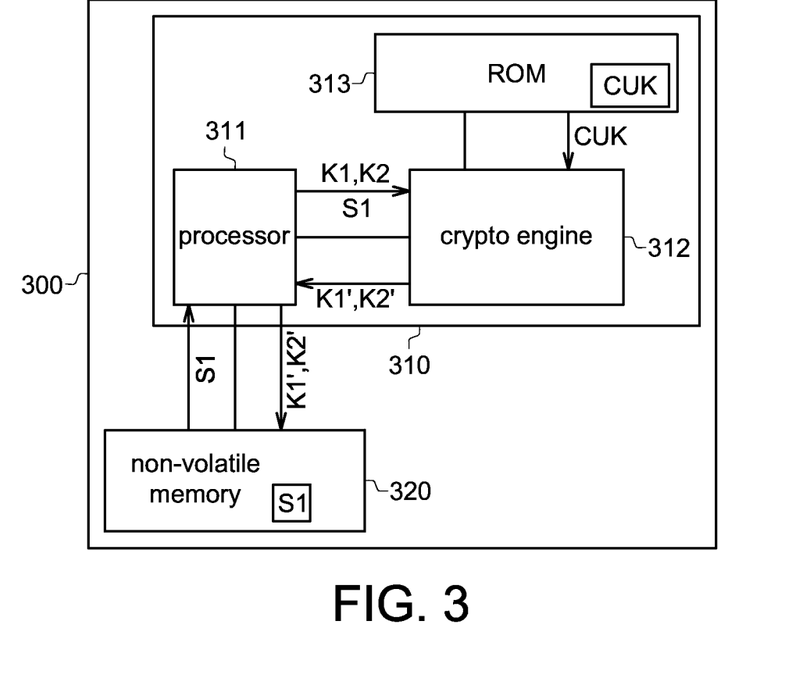
FIG. 3 is a schematic diagram of another example of an electronic device.

FIG. 3 shows a schematic diagram of another example of the electronic device 100. One main difference of an electronic device 300 from the electronic device 200 is that, a non-volatile memory 320 stores a salt value, e.g., a salt value S1. A salt value corresponds to a predetermined value of an application of a service provider. For example, the salt value S1 corresponds to a predetermined value of the application AP1 of the service provider 20, and may be generated by random number generator of hardware or software or may be designed according to requirements. A key protecting device 310 encrypts the key K1 inputted according to the salt value S1 and the chip unique key CUK stored in a ROM 313 to generate the encrypted key K1'.

Figure 4:
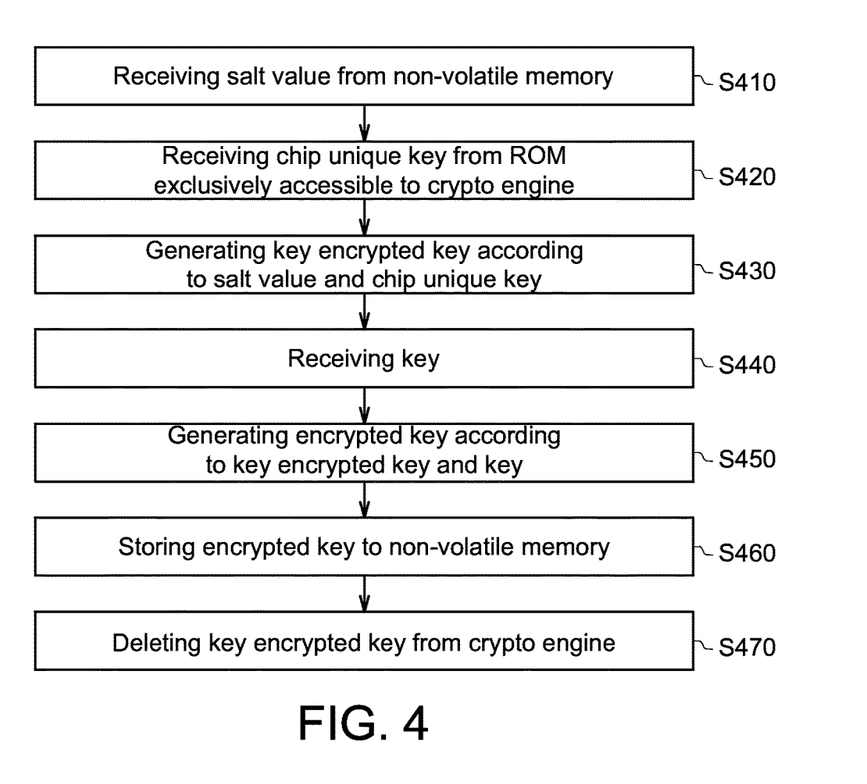
FIG. 4 is a flowchart of an example of an encrypting method in a key protecting method.

FIG. 4 shows a flowchart of an encrypting method in a key protecting method.

In step S410, a salt value is received from a non-volatile memory. For example, a processor 311 receives the salt value S1 from the non-volatile memory 320, and a crypto engine 312 receives the salt value S1 from the processor 311. In one embodiment, the processor 311 enquires the non-volatile memory 320 and the crypto engine 312 through polling, obtains the salt value S1 from the non-volatile memory 320, and transmits the salt value S1 to the crypto engine 312. Further, the non-volatile memory 320 and the crypto engine 312 issue an interrupt request to the processor 311 through interrupt, such that the processor 311 obtains the salt value S1 and transmits the salt value S1 to the crypto engine 312.

In step S420, a chip unique key is received from a ROM that is exclusively accessible to the crypto engine. For example, the crypto engine 312 receives the chip unique key CUK from the ROM 313. Further, the sequences for performing steps S410 and S420 may be swapped, and are not limited to those shown in FIG. 4. For example, step S420 may be performed before step S410.

In step S430, a key encrypted key is generated according to the salt value and the chip unique key. For example, the crypto engine 312 generates a key encrypted key KEK1 according to the salt value S1 and the chip unique key CUK. The key encrypted key KEK1 is temporarily stored in the crypto engine 312 to be later used in step S450 and be deleted after having been used. More specifically, the crypto engine 312 performs a key encrypted key process according to the salt value S1 and the chip unique key CUK to generate the key encrypted key KEK1. For example, the key encrypted key process may be, but not limited to, the AES or an XOR logic computation.

In step S440, a key is received. For example, the crypto engine 312 receives the key K1 from the processor 311.

In step S450, an encrypted key is generated according to the key encrypted key and the key. For example, the crypto engine 312 generates the encrypted key K1' according to the key encrypted key KEK1 and the key K1. More specifically, the crypto engine 312 performs a key process according to the key encrypted key KEK1 and the key K1 to generate the encrypted key K1'. For example, but not limited to, the key process may be the AES or an XOR logic computation. In one embodiment, the key encrypted key process in step S430 may be the AES, and the key process in step S450 may be an XOR logic computation. In another embodiment, the key encrypted key process in step S430 is an XOR logic computation, and the key process in step S450 is the AES.

In step S460, the encrypted key is stored to the non-volatile memory. For example, the processor 311 obtains the encrypted key K1' from the crypto engine 312, and stores the encrypted key K1' to the non-volatile memory 320.

In step S470, the key encrypted key is deleted from the crypto engine. For example, the crypto engine 312 deletes the key encrypted key KEK1 from the crypto engine 312 and does not store the key encrypted key KEK1 anywhere in the electronic device 300, so as to reduce the possibility of theft of the key encrypted key KEK1. Further, it should be noted that, the sequences of steps S460 and S470 may be swapped or may be parallel, and are not limited to those shown in FIG. 4. For example, step S470 may be performed before step S460, or steps S460 and S470 may be performed simultaneously.

Further, in FIG. 3, the key protecting device 310 encrypts the key K2 according to only the chip unique key CUK in the ROM 313 to generate the encrypted key K2'. Details of the method that the key protecting device 310 uses to encrypt the key K2 to generate the encrypted key K2' are as those of the method that the key protecting device 210 uses to encrypt the key K2 to generate the encrypted key K2', and shall be omitted herein.

As such, even when there is a loophole in the application AP2 provided by the service provider 40 and installed on the electronic device 300, in a way that an intruder may provide the encrypted key K2' provided by the service provider 40 and stored in the non-volatile memory 320 to the crypto engine 312 and control the crypto engine 312 to decrypt the encrypted key K2' using the chip unique key CUK to obtain the key K2 of the service provider 40, as the encrypted key K1' is generated from encrypting the key K1 through the salt value S1 and the chip unique key CUK, the intruder is incapable of providing the encrypted key K1' provided by the service provider 20 and stored in the non-volatile memory 320 to the crypto engine 312 and controlling the crypto engine 312 to decrypt the encrypted key K1' using the chip unique key CUK to obtain the correct key K1. It is known from above that, by encrypting the key K1 using the salt value S1 and the chip unique key CUK, it is improbable that the key K1 of the service provider 20 be hacked due to a loophole AP2 in the application AP2 provided by the service provider 40 and installed on the electronic device 300, thereby enhancing the security of the key.

Figure 5:
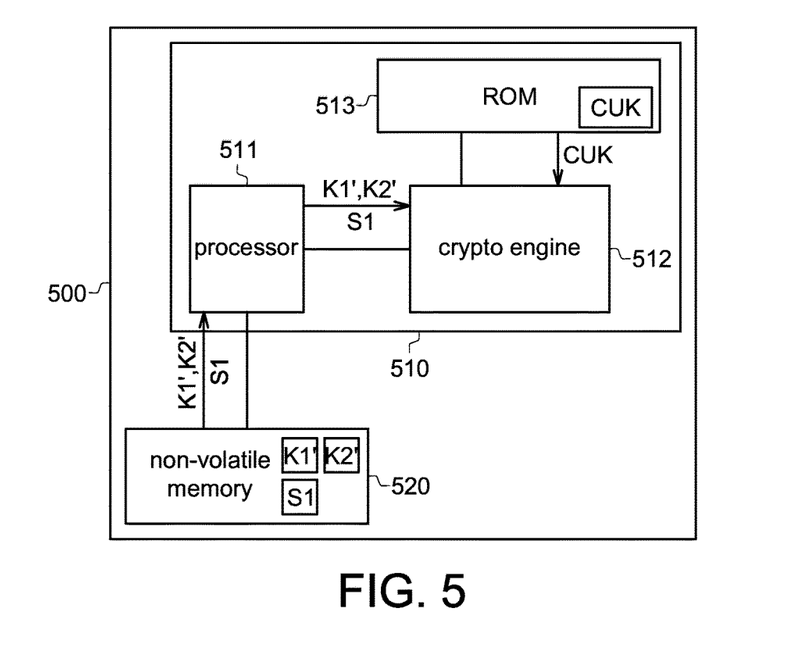
FIG. 5 is a schematic diagram of another example of an electronic device.

FIG. 5 shows a schematic diagram of another example of the electronic device 100. One main difference of an electronic device 500 from the electronic device 300 is that, a non-volatile memory 520 further stores the encrypted keys K1' and K2'. More specifically, the status of the electronic device 500 is the key protecting device 310 of the electronic device 300 having generated the keys K1' and K2', and stored the encrypted keys K1' and K2' to the non-volatile memory. Before the electronic device 500 decrypts the encrypted content encrypted key CK1' of the service provider 20 using the key K1 to obtain the content encrypted key CK1 of the service provider 20 and decrypts the encrypted service content C1' of the service provider 20 using the content encrypted key CK1 to obtain the service content C1 of the service provider 20, the electronic device 500 needs to first decrypt the encrypted key K1' stored in the non-volatile memory 520 to obtain the key K1.

Figure 6:
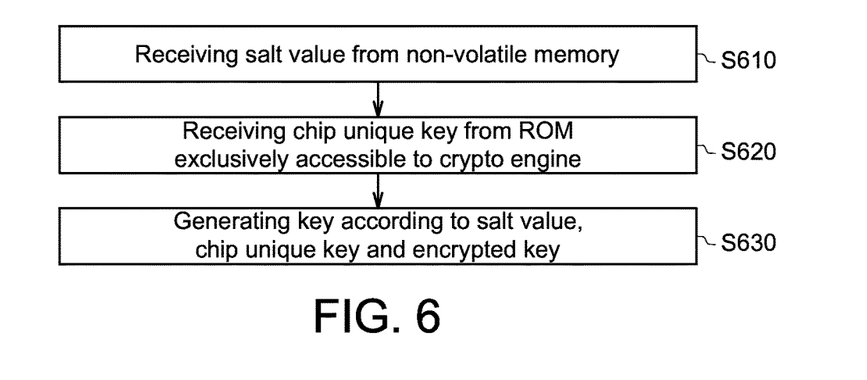
FIG. 6 is a flowchart of an example of a decrypting method in a key protecting method.

FIG. 6 shows a flowchart of an example of a decrypting method in a key protecting method.

In step S610, a salt value is received from a non-volatile memory. For example, a processor 511 receives the salt value S1 from the non-volatile memory 520, and a crypto engine 512 receives the salt value S1 from the processor 511.

In step S620, a chip unique key is received from a ROM that is exclusively accessible to the crypto engine. For example, the crypto engine 512 receives the chip unique key CUK from a ROM 513 that is exclusively accessible to the crypto engine 512. Further, it should be noted that, the sequences of steps S610 and S620 may be swapped, and are not limited to those shown in FIG. 6. For example, step S620 may be performed before step S610.

In step S630, a key is generated according to the salt value, the chip unique key and an encrypted key. For example, the processor 511 obtains an encrypted key K1' from the non-volatile memory 520, and the crypto engine 512 receives the encrypted key K1' from the processor 511 and generates a key K1 according to the salt value S1, the chip unique key CUK and the encrypted key K1'.

Figure 7:
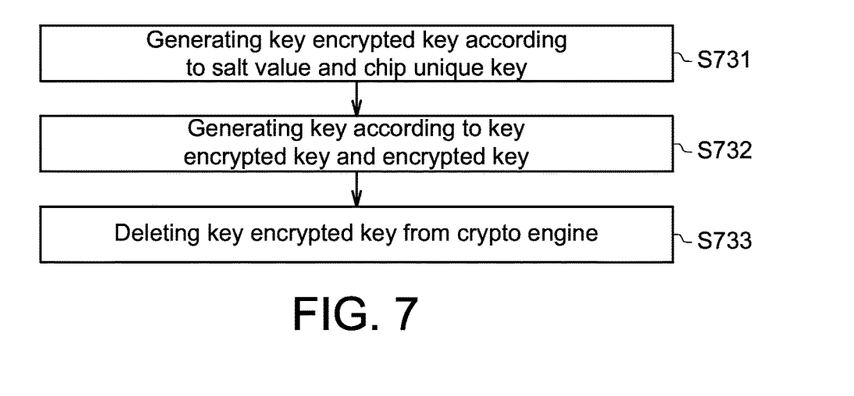
FIG. 7 is a detailed flowchart of step S630 in FIG. 6.

FIG. 7 shows a detailed flowchart of step S630 in FIG. 6. In one embodiment, step S630 may include steps S731, S732 and S733.

In step S731, the crypto engine 512 generates the key encrypted key KEK1 according to the salt value S1 and the chip unique key CUK. The key encrypted key KEK1 is temporarily stored in the crypto engine 512, and is to be later used in step S732 and deleted after having been used. More specifically, the crypto engine 512 performs a key encrypted key process according to the salt value S1 and the chip unique key CUK to generate the key encrypted key KEK1. For example, but not limited to, the key encrypted key process may be the AES or an XOR logic computation.

In step S732, the key is generated according to the key encrypted key and the encrypted key. For example, the crypto engine 512 generates the key K1 according to the key encrypted key KEK1 and the encrypted key K1'. More specifically, the crypto engine 512 performs a key process according to the key encrypted key KEK1 and the encrypted key K1' to generate the key K1. For example, but not limited to, the key process may be the AES or an XOR logic computation. In one embodiment, when the key process in step S450 in FIG. 4 is the AES, the key process in step S732 is the AES. In another embodiment, when the key process in step S450 in FIG. 4 is an XOR logic computation, the key process in step S732 is an XOR logic computation.

In step S733, the key encrypted key is deleted from the crypto engine. For example, the crypto engine 512 deletes the key encrypted key KEK1 from the crypto engine 512 and does not store the key encrypted key KEK1 anywhere in the electronic device 500, so as to reduce the possibility of theft of the key encrypted key KEK1. Further, it should be noted that, the sequences of steps S732 and S733 may be swapped or may be parallel, and are not limited to those shown in FIG. 7. For example, step S733 may be performed before step S732, or steps S732 and S733 may be performed simultaneously.

Similarly, before the electronic device 500 decrypts the encrypted content encrypted key CK2' of the service provider 40 using the key K2 to obtain the content encrypted key CK2 of the service provider 40 and decrypts the encrypted service content C2' of the service provider 40 using the content encrypted key CK2 to obtain the service content C2 of the service provider 40, the electronic device 500 needs to first decrypt the encrypted key K2' stored in the non-volatile memory 520 to obtain the key K2. In one embodiment, the encrypted key K2' is generated from encrypting the key K2 according to only the chip unique key CUK. Thus, the electronic device 500 only needs to decrypt the encrypted key K2' according to only the chip unique key CUK to obtain the key K2. For example, the processor 511 obtains the encrypted key K2' from the non-volatile memory 520, and the crypto engine 512 receives the encrypted key K2' from the processor 511 and the chip unique key CUK from the ROM 513 that is exclusively accessible to the crypto engine 512, and generates the key K2 according to the chip unique key CUK and the encrypted key K2'.

Figure 8:
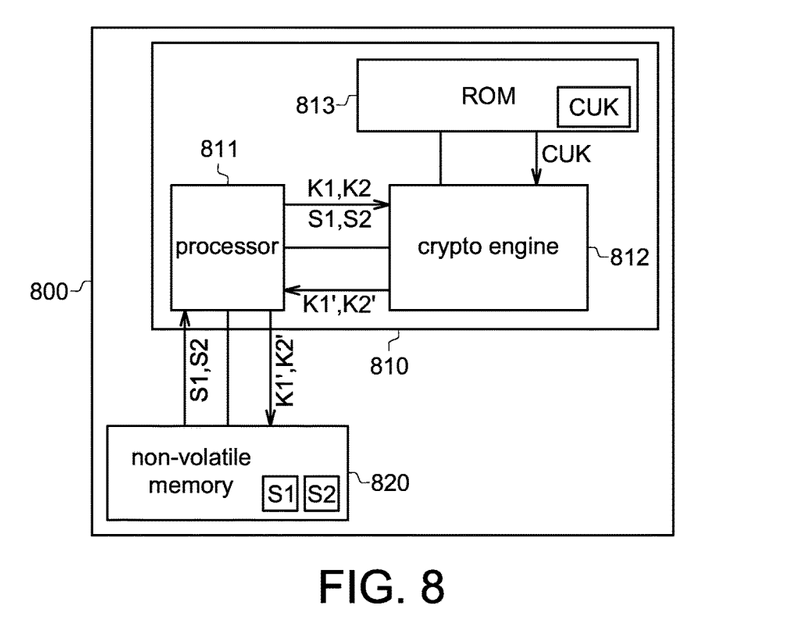
FIG. 8 is a schematic diagram of another example of an electronic device.

FIG. 8 shows a schematic diagram of another example of the electronic device 100. One main difference of an electronic device 800 from the electronic device 300 is that, a non-volatile memory 820 of the electronic device 800 further stores a plurality of different salt values, e.g., salt values S1 and S2, respectively corresponding to applications of different service providers. For example, the salt value S1 corresponds to a predetermined value of the application AP1 of the service provider 20, and the salt value S2 corresponds to another predetermined value of the application AP2 of the service provider 40, wherein the another predetermined value is different from the salt value S1. Similarly, the plurality of different salt values may be generated by a random number generator of hardware or software, or may be designed according to requirements. Details of the method that key protecting device 810 uses to encrypt the key K1 inputted according to the salt value S1 and the chip unique key CUK stored in a ROM 813 to generate the encrypted key K1', and details of the method that the key protecting device 810 uses to encrypt the key K2 inputted according to salt value S2 and the chip unique key CUK stored in the ROM 813 to generate the encrypted key K2', are similar to those described in the method that the key protecting device 310 in FIG. 3 uses to encrypt the key K1 inputted according to the salt value S1 and the chip unique key CUK stored in the ROM 313 to generate the encrypted key K1'. Such repeated details shall be omitted herein.

As the salt value S1 corresponding to the application AP1 of the service provider 20 is different from the salt value S2 corresponding to the application AP2 of the service provider 40, the key encrypted key KEK1 of the service provider 20 generated according to the key encrypted key process is also different from the key encrypted key KEK2 of the service provider 40 generated according to the key encrypted key process. Thus, even when there is a loophole in the application AP2 provided by the service provider 40 and installed on the electronic device 800, in a way that an intruder may provide the encrypted key K2' provided by the service provider 40 and stored in the non-volatile memory 820 to the crypto engine 812 and control the crypto engine 812 to decrypt the encrypted key K2' using the chip unique key CUK and the salt value S2 to obtain the key K2 of the service provider 40, as the encrypted key K1' is generated from encrypting the key K1 through the salt value S1 different from the salt value S2 and the chip unique key CUK, the intruder is incapable of providing the encrypted key K1' provided by the service provider 20 and stored in the non-volatile memory 820 to the crypto engine 812 and controlling the crypto engine 812 to decrypt the encrypted key K1' using the chip unique key CUK and the salt value S2 to obtain the correct key K1; and vice versa. It is known from above that, by encrypting the key K1 using the salt value S1 and the chip unique key CUK and encrypting the key K2 using the salt value S2 different from the salt value S1 and the chip unique key CUK, it is improbable that the key K1 of the service provider 20 be hacked due to a loophole in the application AP2 provided by the service provider 40 and installed on the electronic device 800, and it is also improbable that the key K2 of the service provider 40 be hacked due to a loophole in the application AP1 provided by the service provider 20 and installed on the electronic device 800, thereby enhancing the security of the key.

Figure 9:
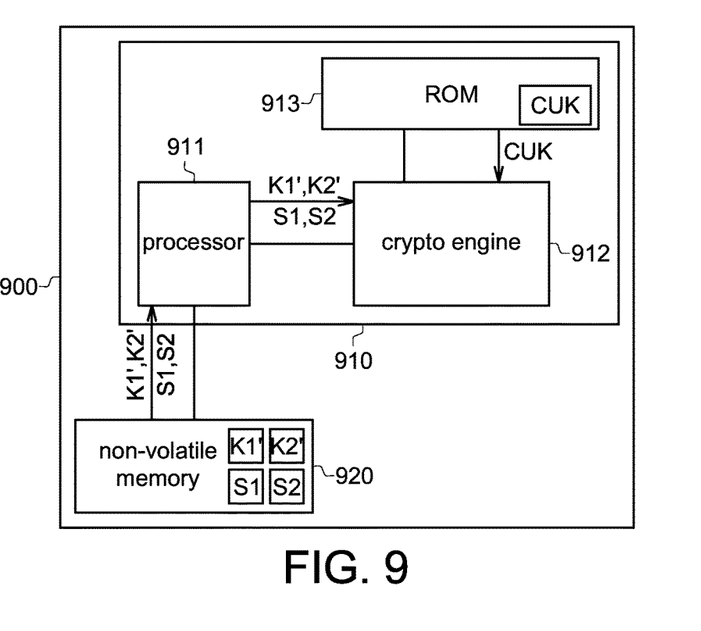
FIG. 9 is a schematic diagram of another example of an electronic device.

FIG. 9 shows a schematic diagram of another example of the electronic device 100. One main difference of an electronic device 900 from the electronic device 800 is that, a non-volatile memory 920 further stores the encrypted keys K1' and K2'. More specifically, the status of the electronic device 900 is the key protecting device 810 of the electronic device 800 having generated the keys K1' and K2', and stored the encrypted keys K1' and K2' to the non-volatile memory. Before the electronic device 900 decrypts the encrypted content encrypted key CK1' of the service provider 20 using the key K1 to obtain the content encrypted key CK1 and decrypts decrypts the encrypted service content C1' of the service provider 20 using the content encrypted key CK1 to obtain the service content C1, the electronic device 900 needs to first decrypt the encrypted key K1' stored in the non-volatile memory 920 to obtain the key K1. Similarly, before the electronic device 900 decrypts the encrypted content encrypted key CK2' of the service provider 40 using the key K2 to obtain the content encrypted key CK2 of the service provider 40 and decrypts the encrypted service content C2' of the service provider 40 using the content encrypted key CK2 to obtain the service content C2, the electronic device 900 needs to first decrypt the encrypted key K2' stored in the non-volatile memory 920 to obtain the key K2. Details of the method that the key protecting device 910 uses to decrypt the encrypted key K1' according to the salt value S1 and the chip unique key CUK stored in a ROM 913 to generate the key K1, and details of the method that the key protecting device 910 uses to decrypt the encrypted key K2' according to the salt value S2 and the chip unique key CUK stored in the ROM 913, are similar to those of the method that the key protecting device 510 uses to decrypt the encrypted key K1' according to the salt value S1 and the chip unique key CUK stored in the ROM 513 to generate the key K1. Such repeated details shall be omitted herein.

Figure 10:
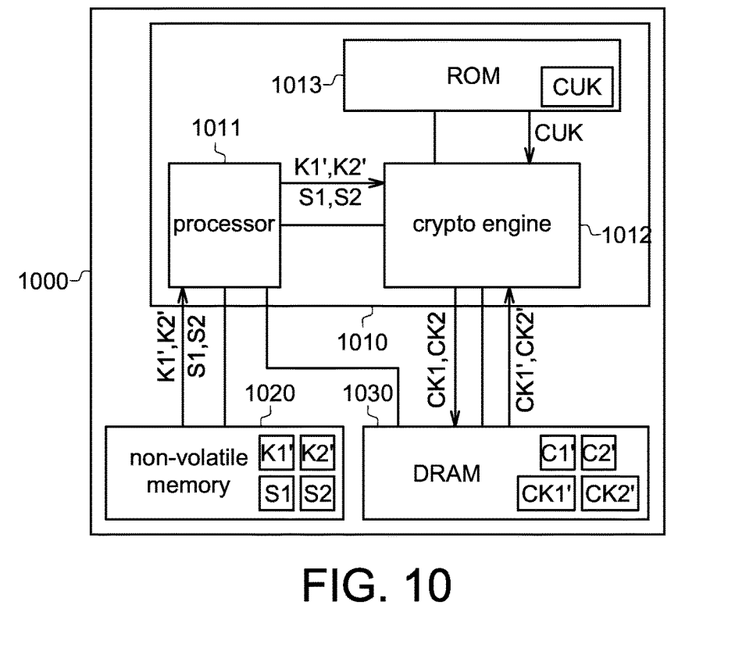
FIG. 10 is a schematic diagram of another example of an electronic device.

FIG. 10 shows a schematic diagram of another example of the electronic device 100. One main difference of an electronic device 1000 from the electronic device 900 is that, the electronic device 1000 further includes a dynamic random access memory (DRAM) 1030 coupled to a processor 1011. The DRAM 1030 stores the encrypted content C1' and the encrypted content encrypted key CK1' obtained from the service provider 20 through the application AP1, and the encrypted service content C2' and the encrypted content encrypted key CK2' obtained from the service provider 40 through the application AP2.

In one embodiment, after the electronic device 1000 obtains the encrypted service content C1' and the encrypted content encrypted key CK1' from the service provider 20, the electronic device 1000 first stores the encrypted service content C1' and the encrypted content encrypted key CK1' to the DRAM 1030. The key encrypted key KEK1 is generated according to the salt value S1 and the chip unique key CUK stored in a ROM 1013, the encrypted key K1' is decrypted according to the key encrypted key KEK1 to obtain the key K1, and the encrypted content encrypted key CK1' is decrypted according to the key K1 to obtain the content encrypted key CK1. In one embodiment, the content encrypted key CK1 is stored into the DRAM 1030. The electronic device 1000 may later decrypt the encrypted service content C1' obtained from the service provider 20 using the content encrypted key CK1 to obtain the service content C1.

Similarly, in one embodiment, after the electronic device 1000 obtains the encrypted service content C2' and the encrypted content encrypted key CK2' from the service provider 40, the electronic device 1000 first stores the encrypted service content C2' and the encrypted content encrypted key CK2' into the DRAM 1030. The key encrypted key KEK2 is generated according to the salt value S2 and the chip unique key CUK stored in the ROM 1030, the encrypted key K2' is decrypted according to the key encrypted key KEK2 to obtain the key K2, and the encrypted content encrypted key CK2' is decrypted according to the key K2 to obtain the content encrypted key CK2. In one embodiment, the content encrypted key CK2 is stored into the DRAM 1030. The electronic device 1000 may later decrypt the encrypted service content C2' obtained from the service provider 40 using the content encrypted key CK2 to obtain the service content C2.

Figure 11:
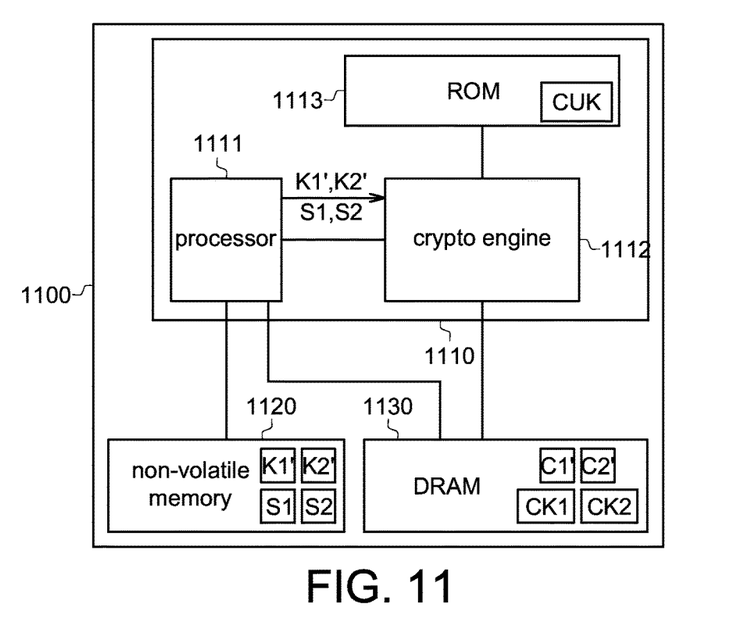
FIG. 11 is a schematic diagram of another example of an electronic device.

FIG. 11 shows a schematic diagram of another example of the electronic device 100. More specifically, the status of an electronic device 1100 is the electronic device 1000 having decrypted the encrypted content encrypted keys CK1' and CK2' to obtain the content encrypted keys CK1 and CK2, and stored the content encrypted keys CK1 and CK2 into a DRAM 1130. The content encrypted keys CK1' and CK2' in the DRAM 1130 are replaced by the content encrypted keys CK1 and CK2.

It is known from the above that, the content encrypted keys CK1 and CK2 for decrypting the encrypted service contents C1' and C2' may be stored in the DRAM 1130. Thus, in the event of a loophole in the electronic device 1100 that allows an intruder to directly access the encrypted content keys CK1 and CK2 in the DRAM 1130 through a processor 1111, the encrypted service content C1' or C2' provided by the service provider 20 or 40 may be decrypted according to the content encrypted key CK1 or CK2 to obtain the service content C1 or C2.

Figure 12:
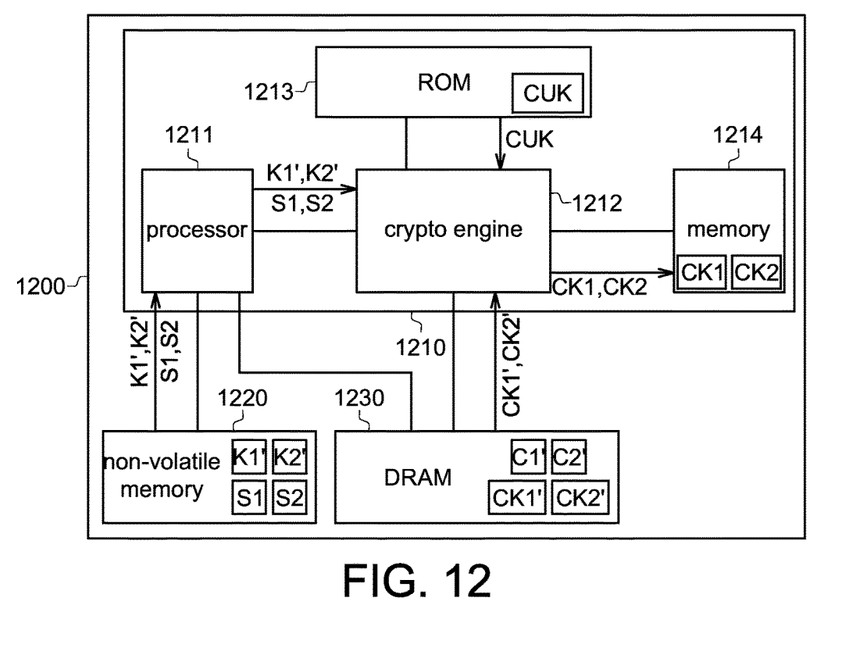
FIG. 12 is a schematic diagram of another example of an electronic device.

To solve the above issue, in another embodiment, the content encrypted key may be stored in a memory that is exclusively accessible to a crypto engine. FIG. 12 shows a schematic diagram of another example of the electronic device 100. One main difference of an electronic device 1200 from the electronic device 1100 is that, the electronic device 1200 further includes a memory 1214. The memory 1214 is coupled to a crypto engine 1212, and is exclusively accessible to the crypto engine 1212. In one embodiment, the memory 1214 is a static random access memory (SRAM).

In one embodiment, after the electronic device 1200 obtains the encrypted service content C1' and the encrypted content encrypted key CK1' from the service provider 20, the electronic device 1200 first stores the encrypted service content C1' and the encrypted content encrypted key CK1' to a DRAM 1230. Next, a processor 1211 obtains the salt value S1 and the encrypted key K1' from a non-volatile memory 1220, and a crypto engine 1212 receives the chip unique key CUK from a ROM 1213 and the salt value S1 and the encrypted key K1' from the processor 1211, and generates the key K1 according to the salt value S1, the chip unique key CUK and the encrypted key K1'. The key K1 is temporarily stored in the crypto engine 1212, and is to be later used. The crypto engine 1212 then receives the encrypted content encrypted key CK1' from the DRAM 1230, generates the content encrypted key CK1 according to the key K1 and the encrypted content encrypted key CK1' temporarily stored therein, and stores the content encrypted key CK1 to the memory 1214 that is exclusively accessible to the crypto engine 1212. Next, the electronic 1200 decrypts the encrypted service content C1' obtained from the service provider 20 using the content encrypted key CK1 to obtain the service content C1. After the crypto engine 1212 generates the content encrypted key CK1 according to the key K1, the key K1 is deleted from the crypto engine 1212 to enhance the security of the key K1.

Similarly, in one embodiment, after the electronic device 1200 obtains the encrypted service content C2' and the encrypted content encrypted key CK2' from the service provider 40, the electronic device 1200 first stores the encrypted service content C2' and the encrypted content encrypted key CK2' to the DRAM 1230. Next, the processor 1211 obtains the salt value S2 and the encrypted key K2' from the non-volatile memory 1220, and the crypto engine 1212 receives the chip unique key CUK from the ROM 1213 and the salt value S2 and the encrypted key K2' from the processor 1211, and generates the key K2 according to the salt value S2, the chip unique key CUK and the encrypted key K2'. The key K2 is temporarily stored in the crypto engine 1212, and is to be used in a subsequent step. The crypto engine 1212 then receives the encrypted content encrypted key CK2' from the DRAM 1230, generates the content encrypted key CK2 according to the key K2 and the encrypted content encrypted key CK2' temporarily stored therein, and stores the content encrypted key CK2 into the memory 1214 that is exclusively accessible to the crypto engine 1212. The electronic device 1200 may later decrypt the encrypted service content C2' obtained from the service provider 40 using the content encrypted key CK2 to obtain the service content C2. After the crypto engine 1212 generates the content encrypted key CK2 according to the key K2, the key K2 is deleted from the crypto engine 1212 to enhance the security of the key K2.

As such, even when there is a loophole in the electronic device 1200, in a way that an intruder may directly access the content of the DRAM 1230 through the processor 1211, as the content encrypted keys CK1 and CK2 for decrypting the encrypted service contents C1' and C2' are stored in the memory 1214 that is exclusively accessible to the crypto engine 1212 instead of the DRAM 1230, the intruder is incapable obtaining the content encrypted keys CK1 and CK2 through accessing the DRAM 1230, thereby enhancing the security of the content encrypted keys CK1 and CK2.

As demonstrated in the above embodiments, the chip unique key in the ROM is exclusively accessible to the crypto engine but no other units, and so the chip unique key is kept secure. Through the key protecting device, not only the method for obtaining the chip unique key is secure, but also the approach of generating different key encrypting keys for encrypting the keys of different service providers according to different salt values and the chip unique key for different service providers further enhances the security of the keys of the service providers. Moreover, the security of service contents of service providers is further indirectly enhanced.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key protecting device, comprising:
a crypto engine;
a read-only memory (ROM), storing a chip unique key, exclusively accessible to the crypto engine; and
a processor configured to:
obtain an encrypted service content and an encrypted content encrypted key from a service provider;
store the encrypted service content and the encrypted content encrypted key in dynamic random access memory (DRAM); and
receive a first salt value and a first encrypted key from a non-volatile memory,
wherein the crypto engine receives the chip unique key from the ROM that is exclusively accessible to the crypto engine, receives the first salt value and the first encrypted key from the processor, uses the first salt value and the chip unique key to decrypt the first encrypted key to generate a first key and then uses the first key to decrypt the encrypted content encrypted key to generate a content encrypted key, and uses the content encrypted key to decrypt the encrypted service content to generate a service content for display.

2. The key protecting device according to claim 1, wherein the crypto engine generates a first key encrypted key according to the first salt value and the chip unique key, and stores the first key encrypted key therein; the crypto engine generates the first key according to the first key encrypted key and the first encrypted key, and deletes the first key encrypted key from the crypto engine.

3. The key protecting device according to claim 2, wherein:
the processor receives a second salt value and a second encrypted key from the non-volatile memory; the second salt value is different from the first salt value;
the crypto engine receives the chip unique key from the ROM that is exclusively accessible to the crypto engine, receives the second salt value from the processor, and generates a second key encrypted key according to the second salt value and the chip unique key; the second key encrypted key is different from the first key encrypted key; and
the crypto engine receives the second encrypted key from the processor, and stores the second key encrypted key therein; the crypto engine generates a second key according to the second key encrypted key and the second encrypted key, and deletes the second key encrypted key from the crypto engine.

4. The key protecting device according to claim 3, wherein the ROM is a one-time programmable (OTP) memory or an e-fuse.

5. The key protecting device according to claim 3, wherein:
the processor receives the first salt value from the non-volatile memory; the crypto engine receives the first salt value from the processor, receives the chip unique key from the ROM that is exclusively accessible to the crypto engine, generates the first key encrypted key according to the first salt value and the chip unique key, and stores the first key encrypted key therein;
the processor obtains the first key; the crypto engine receives the first key from the processor, generates the first encrypted key according to the first key encrypted key and the first key, and deletes the first key encrypted key from the crypto engine; and
the processor receives the first encrypted key from the crypto engine, and stores the first encrypted key to the non-volatile memory.

6. The key protecting device according to claim 5, wherein:
the processor obtains the second key, and receives the second salt value from the non-volatile memory; the second salt value is different from the first salt value;
the crypto engine receives the chip unique key from the ROM that is exclusively accessible to the crypto engine, receives the second salt value from the processor, generates the second key encrypted key according to the second salt value and the chip unique key, and stores the second key encrypted key therein; the second key encrypted key is different from the first key encrypted key;
the crypto engine receives the second key from the processor, generates the second encrypted key according to the second key encrypted key and the second key, and deletes the first key encrypted key from the crypto engine; and
the processor receives the second encrypted key from the crypto engine, and stores the second encrypted key to the non-volatile memory.

7. The key protecting device according to claim 3, further comprising:
a memory, exclusively accessible to the crypto engine;
wherein, the crypto engine receives a first encrypted content encrypted key, generates a first content encrypted key according to the first key and the first encrypted content encrypted key, and stores the first content encrypted key into the memory.

8. The key protecting device according to claim 7, wherein the memory is a static random access memory (SRAM).

9. A key protecting method, comprising:
obtaining an encrypted service content and an encrypted content encrypted key from a service provider;
storing the encrypted service content and the encrypted content encrypted key in dynamic random access memory (DRAM);
receiving a first salt value from a non-volatile memory;
receiving a chip unique key from a ROM that is exclusively accessible to a crypto engine;
generating a first key according to the first salt value, the chip unique key and a first encrypted key
employing the first salt value and the chip unique key to decrypt the first encrypted key to generate a first key;
employing the first key to decrypt the encrypted content encrypted key to generate a content encrypted key; and
employing the content encrypted key to decrypt the encrypted service content to generate a service content for display.

10. The key protecting method according to claim 9, wherein the step of generating the first key according to the first salt value, the chip unique key and the first encrypted key comprises:
generating a first key encrypted key according to the first salt value and the chip unique key, and storing the first key encrypted key in the crypto engine;
generating the first key according to the first key encrypted key and the first encrypted key; and
deleting the first key encrypted key from the crypto engine.

11. The key protecting method according to claim 10, further comprising:
   receiving a second salt value from the non-volatile memory, the second salt value being different from the first salt value;
   receiving the chip unique key from the ROM that is exclusively accessible to the crypto engine;
   generating a second key encrypted key according to the second salt value and the chip unique key, and storing the second key encrypted key in the crypto engine, the second key encrypted key being different from the first key encrypted key;
   generating a second key according to the second key encrypted key and a second encrypted key; and
   deleting the second key encrypted key from the crypto engine.

12. The key protecting method according to claim 11, further comprising:
   receiving the first salt value from the non-volatile memory;
   receiving the chip unique key from the ROM that is exclusively accessible to the crypto engine;
   generating the first key encrypted key according to the first salt value and the chip unique key, and storing the first key encrypted key in the crypto engine;
   receiving the first key;
   generating the first encrypted key according to the first key encrypted key and the first key;
   storing the first encrypted key to the non-volatile memory; and
   deleting the first key encrypted key from the crypto engine.

13. The key protecting method according to claim 12, further comprising:
   receiving the second salt value from the non-volatile memory;
   receiving the chip unique key from the ROM that is exclusively accessible to the crypto engine;
   generating the second key encrypted key according to the second salt value and the chip unique key and storing the second key encrypted key in the crypto engine;
   receiving the second key;
   generating the second encrypted key according to the second key encrypted key and the second key;
   storing the second encrypted key to the non-volatile memory; and
   deleting the second key encrypted key from the crypto engine.

14. The key protecting method according to claim 13, further comprising:
   receiving a first encrypted content encrypted key;
   generating a first content encrypted key according to the first key and the first encrypted content encrypted key; and
   storing the first content encrypted key to a memory that is exclusively accessible to the crypto engine.

* * * * *